United States Patent [19]

Coto et al.

[11] Patent Number: 4,817,814

[45] Date of Patent: Apr. 4, 1989

[54] ULTRASONICALLY WELDING A CONDUCTOR WIRE TO AN ELECTRICAL TERMINAL

[75] Inventors: Guillermo Coto, Monroe; Curtis L. Welter, West Haven; Michael Patrikios, Stratford, all of Conn.

[73] Assignee: American Technology, Inc., Milford, Conn.

[21] Appl. No.: 90,328

[22] Filed: Aug. 28, 1987

[51] Int. Cl.⁴ ............................................. B23K 20/10
[52] U.S. Cl. ..................................... 228/110; 228/1.1
[58] Field of Search ................................ 228/1.1, 110

[56] References Cited

U.S. PATENT DOCUMENTS 3,717,842  2/1973  Douglas, Jr. ......................... 228/1.1
4,596,352  6/1986  Knapp ................................. 228/1.1

FOREIGN PATENT DOCUMENTS 133883A   3/1985  European Pat. Off. ............ 228/110
3437749A  4/1986  Fed. Rep. of Germany ...... 228/110

Primary Examiner—Richard K. Seidel
Attorney, Agent, or Firm—Kramer, Brufsky & Cifelli

[57] ABSTRACT

The invention relates to an apparatus and method for ultrasonically welding a conductor wire to an electrical terminal. The terminal has a channel portion for receiving the conductor wire. The electrical terminal with the wire therein is confined adjacent the welding tip whereby movement of the welding tip into the channel portion presses the conductor wire against the electrical terminal and welds it thereto.

12 Claims, 2 Drawing Sheets

ULTRASONICALLY WELDING A CONDUCTOR WIRE TO AN ELECTRICAL TERMINAL

BACKGROUND AND SUMMARY OF THE INVENTION

This application relates to U.S. patent application Ser. No. 33,810, entitled "Ultrasonic Weld Location Mask and Method of Use" by Hawkins et al, filed Apr. 3, 1987; U.S. patent application Ser. No. 34,613, entitled "Variably-weighted Ultrasonic Welding Horn" by Welter filed Apr. 6, 1987; U.S. patent application Ser. No. 34,848, entitled "Ultrasonic Welding Wire Termination Apparatus" by Hawkins et al filed Apr. 6, 1987; and U.S. patent application Ser. No. 36,477, entitled "Apparatus for Ultrasonic Welding of Wires" by Welter et al filed Apr. 9, 1987; each of these applications being assigned to a common assignee with the present invention.

While the invention is subject to wide range of applications, it is especially suited for ultrasonically welding a conductor wire to an electrical terminal. In particular, the present invention is directed to the apparatus and method of using the apparatus whereby a conductor wire is ultrasonically welded to the channel portion of an electrical terminal.

The end of a metal conductor wire may be ultrasonically welded to a metal terminal having the wire firmly placed thereon. Typically, the terminal is placed on an anvil and an ultrasonic welding tip presses against the wire and the terminal to apply ultrasonic energy to the wire. The energy is applied so that the tip vibrates both the wire and the terminal to be welded so as to intermolecularly bond the metal workpieces to each other.

A typical example of this method of connecting a wire to an electrical terminal is disclosed in U.S. Pat. No. 3,717,842. The disclosure of this patent sets out a method whereby the conductor wire is first placed in the channel portion of an electrical terminal. Then, tabs forming part of the channel portion are crimped to close the channel portion so that the internal surface of the channel portion is in electrical contact with the wire. Then, the wire is ultrasonically welded to the channel portion. This patent can be distinguished from the present invention because the tabs are first crimped about the wire and then the ultrasonic energy is applied to the crimped tabs. By contrast, the present invention applies the ultrasonic energy directly to the wire which is resting on the electrical terminal. This important innovation produces a very low resistance weld.

Another aspect of the present invention is directed to confining the electrical terminal and moving the welding tip into the terminal to weld the wire thereto. In the past, the welding tip often came in contact with the walls of a support member. It has been found that the walls of the support member were subject to wear from the vibrations of the ultrasonic welding process. Therefore, the apparatus required rebuilding with new parts on a frequent basis. For example, in U.S. patent application Ser. No. 34,848, the tip of the ultrasonic horn contacts the walls of the supporting elements. Although the apparatus disclosed in the application Ser. No. 34,848 has been found to be very effective, it does require attention to wear of the support elements due to the vibration of the welding tip.

It is a problem underlying the present invention to provide an apparatus and method of ultrasonically welding an electric wire to an electrical terminal whereby the welding apparatus has an extended life expectancy and the weld between the wire and the electrical terminal has a very low resistance.

It is an advantage of the present invention to provide an apparatus and process for ultrasonically welding a conductor wire to an electrical terminal which obviates one or more limitations and disadvantages of the described prior arrangements.

It is a further advantage of the present invention to provide an apparatus and method for ultrasonically welding a conductor wire to an electrical terminal whereby the side walls of the electrical terminal are in contact with the welding tip of the ultrasonic welding device.

It is a yet further advantage of the present invention to provide an apparatus and process for ultrasonically welding a conductor wire to an electrical terminal whereby the electrical connection between the wire and the terminal has a very low resistance.

It is a still further advantage of the present invention to provide an apparatus and process for ultrasonically welding a conductor wire to an electrical terminal whereby the welding is very efficient and economical.

Accordingly, there has been provided an apparatus and process for ultrasonically welding a conductor wire to an electrical terminal. The terminal has a channel portion with a relatively unbroken internal surface for receiving one or more conductor wires and tabs forming part of the channel portion. The apparatus comprises an ultrasonic horn having a welding tip sized to enter the channel portion. Structure is provided for confining the electrical terminal and one or more conductor wires within the channel portion of the terminal adjacent the welding tip so that movement of the welding tip into the channel portion presses the conductor wire against the relatively unbroken surface of the electrical terminal to which it is to be welded.

The confining structure comprises a work support device having a U-shaped chamber for receiving the electrical terminal. The tabs of the channeled portion contact the walls of the U-shaped chamber to prevent contact of the welding tip with the chamber walls.

DETAILED DESCRIPTION OF THE PREFERRED EMBODIMENT

Figure 1:
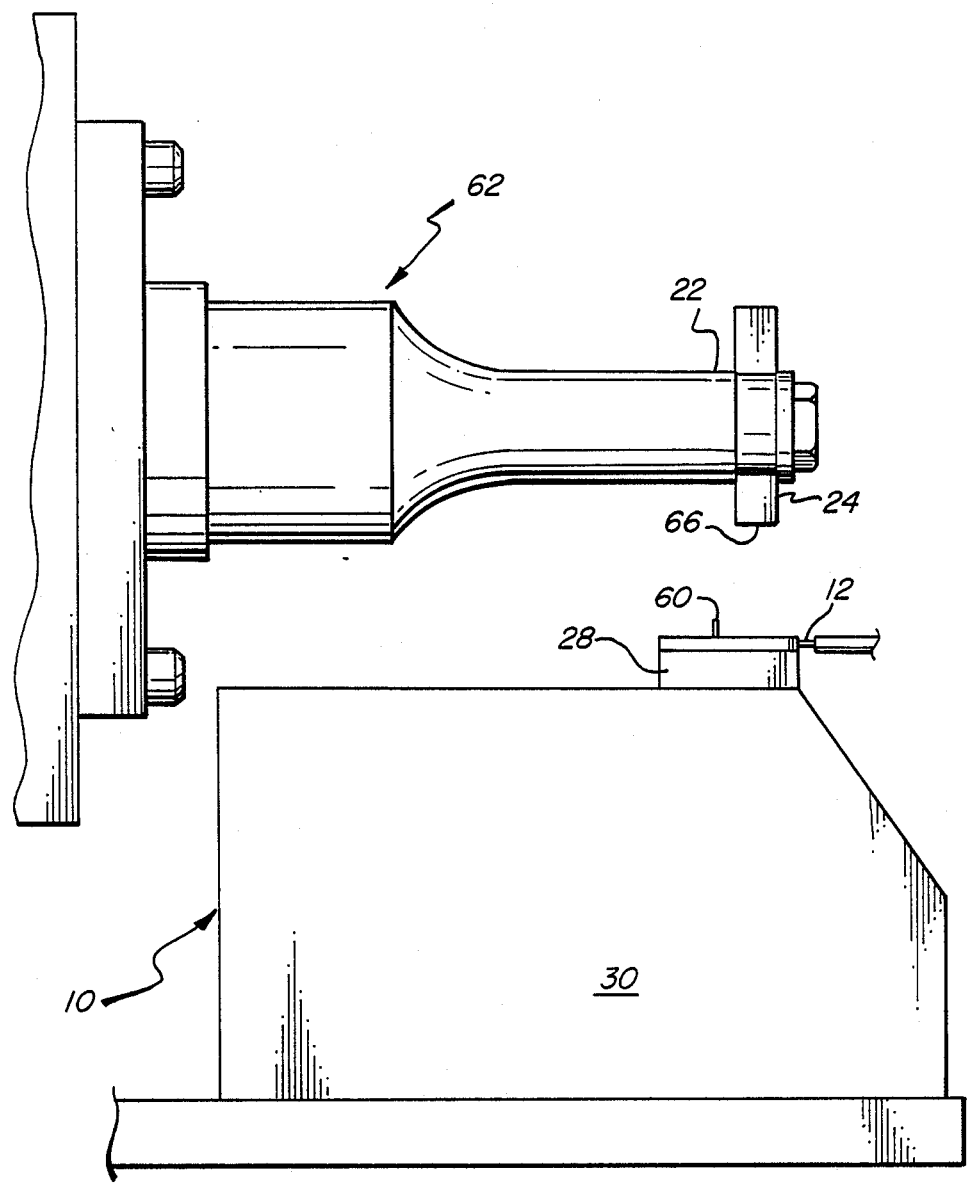
FIG. 1 is a schematic view of an ultrasonic welding device suitable for the present invention.

Referring now to the drawings in detail, there is illustrated an apparatus 10 for ultrasonically welding a conductor wire 12 to an electrical terminal 14. Electrical terminal 14 has a channel portion 16 with a relatively unbroken, internal surface 18 and tabs 20 forming part of the channel portion 16. The apparatus 10 includes an ultrasonic horn 22 having a welding tip 24 sized to enter the channel portion 16. Structure 26 is provided for confining the electrical terminal 14 and the one or more conductor wires 12 within the channel portion 16. The confining structure 26 is disposed adjacent the welding tip 24 whereby movement of the welding tip 24 into the channel portion 16 presses the conductor wire 12 against the relatively unbroken surface 18 of the electrical terminal 14 to which it is to be welded.

Figure 2:
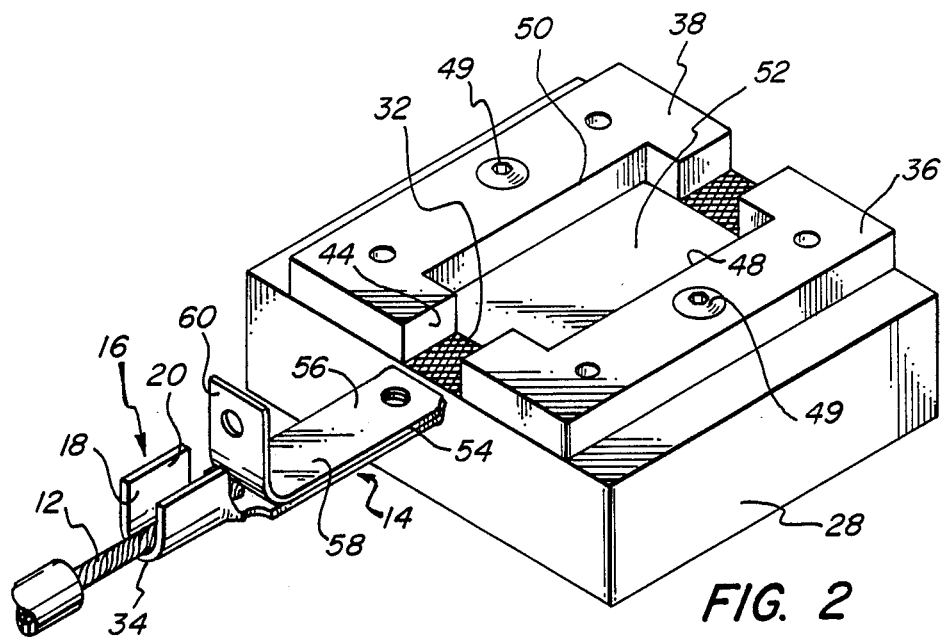
FIG. 2 is an isometric view of a work holder adapted to receive an electrical terminal having an electrical wire supported therein.
Figure 3:
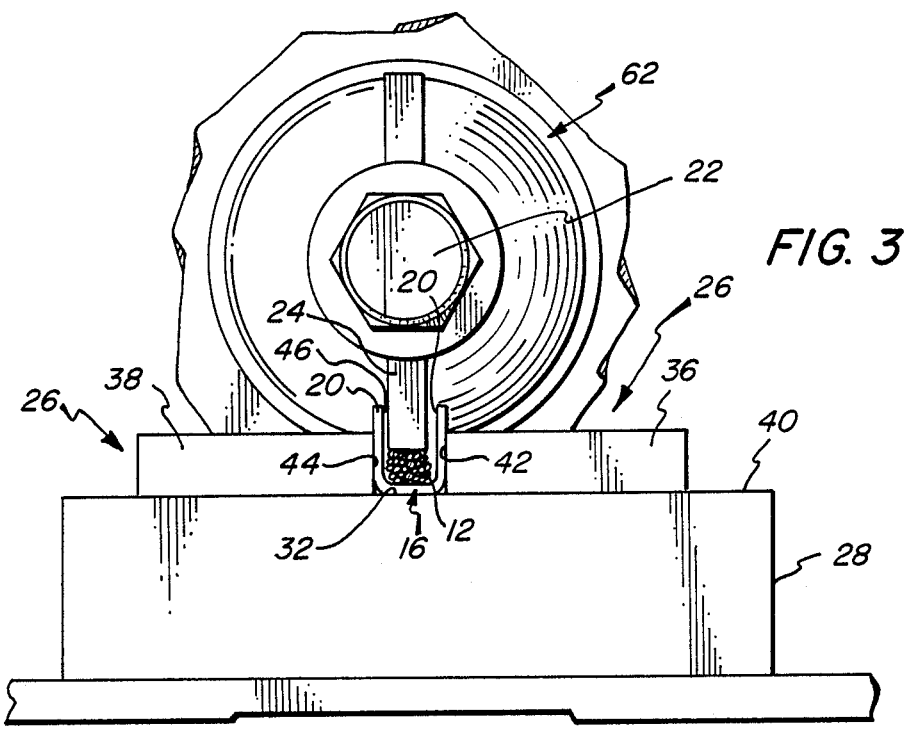
FIG. 3 is a side view, partially in cross-section, of a work holder containing a U-shaped terminal with a wire therein and an electrosonically activated welding tip engaging the wire and pressing the electrical terminal against the base surface of the work support member.

Referring to FIGS. 1 through 3 wherein a preferred embodiment of the apparatus 10 of the present invention is illustrated, a stationary anvil 28 is firmly attached to a base 30. The anvil 28 has a horizontal serrated worksurface 32 which is preferably wider than the width of the portion 34 of the electrical terminal 14 which is in contact with the worksurface 32.

The confining structure 26 includes guide components 36 and 38 which are adjustably affixed to the top surface 40 of the stationary anvil 28. The guide components 36 and 38 each have an inner surface 42 and 44 respectively, as best seen in FIG. 3, which form a U-shaped chamber 46 which receives the electrical terminal 14. Although the guide components 36 and 38 are illustrated as being adjustably connected to the stationary anvil 28 by any desired means such as screws 49, it is also within the terms of the present invention to form the anvil 28 as a unitary construction. Moreover, it is also within the terms of the present invention to form the anvil 28 as a unitary structure with the base 30. The guide components 36 and 38 further include recessed areas 48 and 50 which are disposed to face each other and form a work area 52. Area 52 is sized to confine the edges 54 and 56 of an extending portion 58 of the terminal 14.

Referring to FIG. 2, an isometric view of the terminal 14 is illustrated. The terminal 14 preferably includes a channel portion 16 formed with an internal surface 18 which is relatively unbroken for receiving at least one wire 12. The channel portion 16 also includes two tabs 20 which extend upward from an outer base surface 34. The channel portion 16 of the electrical terminal is preferably U-shaped for cooperating with the chamber 46 formed between the guide components 36 and 38. The remainder of the electrical terminal 14 in the preferred embodiment as shown includes an upstanding wall 60 disposed between the U-shaped channel portion 16 and the extending portion 58. Moreover, any number of holes may be provided in the upstanding wall or in the extending portion as desired. Preferably, the width of the extending portion corresponds to the distance between the recessed areas 48 and 50 so that the walls of the recessed areas will contact the edges 54 and 56 of the extending portion 58 of the terminal to prevent it from moving during the ultrasonic welding step.

Welding of the wire 12 to the electrical terminal 14 is effected by an ultrasonic welding device 62. The device 62 includes an ultrasonic horn 22 having a welding tip 24. The worksurface 66 of the welding tip 24 is preferably serrated so as to firmly grip the wire disposed on the wire terminal and thereby efficiently transmit the ultrasonic energy needed to weld the wire 12 to the electrical terminal 14.

In operation, the electrical terminal 14 is first disposed within the work area 52 so that the outer surface 34 is in contact with the serrated worksurface 32 formed on anvil 28. Next, a conductor wire 12 is disposed within the channel portion 16 and in contact with the internal surface 18. The ultrasonic welding assembly is initially in a position above the anvil 28 as shown in FIG. 1. Then, the welding tip is positioned to contact and press the wire 12 against the internal surface 18 as best illustrated in FIG. 3. This positioning step is preferably accomplished by moving the horn and welding tip 24 towards the anvil 28 and into the chamber formed between the walls 42 and 44 of the guide components 36 and 38. The welding tip is then vibrated at a desired frequency, such as for example about 20,000 cycles per second to weld the wire 12 to the internal surface 18 of the channel portion 16 of the electrical terminal 14.

An important aspect of the present invention is that the welding tip does not contact the sidewalls 42 and 44 of the guide components 36 and 38 respectively. This design significantly reduces the degree of wear on the guide components so as to increase the operating time between their replacement. A second advantage of the present invention resides in the wire being directly welded to the electrical terminal to provide an improved low resistance welded connection. This is a very important aspect of an electrical connection because additional resistance causes the connection to heat and anneal the metal of the connection. The resulting soft metal is often the source of the failure of the electrical connection.

Both the electrical terminal 14 and the conductor wire 12 can be automatically positioned in the U-shaped chamber 46 between the guide components 36 and 38 by any desired means.

The patents and patent applications set forth in this application are intended to be incorporated in their entirety by reference herein.

It is apparent that there has been provided an apparatus and method for ultrasonically welding a conductor wire to an electrical terminal which fully satisfies the objects, means and advantages set forth hereinabove. While the invention has been described in combination with the specific embodiments thereof, it is evident that many alternatives, modifications and variations will be apparent to those skilled in the art in light of the foregoing description. Accordingly, it is intended to embrace all such alternatives, modifications and variations as fall within the sphere and broad scope of the appended claims.

What is claimed:

1. Apparatus for ultrasonically welding a conductor wire to an electrical terminal with a U-shaped channel portion having a relatively unbroken internal surface for receiving one or more conductor wires, and upstanding tabs forming part of said channel portion, comprising:

an ultrasonic horn having a welding tip sized to enter said channel portion;

means for confining said electric terminal and said one or more conductor wires within said U-shaped channel portion adjacent said welding tip;

means for moving said welding tip between said upstanding tabs into said channel portion directly against the conductor wires whereby the upstanding tabs prevent any contact of said welding tip with the confining means; and means for ultrasonically welding said wires with said welding tip to the relatively unbroken surface of the electrical terminal.

2. The apparatus of claim 1 wherein said confining means comprises a work support device having a U-shaped chamber for receiving said electrical terminal, the upstanding tabs of said U-shaped channel portion being in contact with the walls of said U-shaped chamber to prevent contact of said welding tip with the walls of said chamber portion.

3. The apparatus of claim 2 wherein the terminal includes a base surface and wherein the upstanding tabs extend upward from the base surface beyond the walls if the U-shaped chamber.

4. The apparatus of claim 3 wherein said work support device includes an anvil forming a work surface of said U-shaped chamber; and
two guide components affixed to said anvil and having opposing surfaces forming the walls of said U-shaped chamber.

5. The apparatus of claim 4 wherein said guide components are adjustably affixed to said anvil.

6. The apparatus of claim 5 wherein said bottom surface of said U-shaped chamber has a serrated surface to prevent movement of said terminal.

7. The method of ultrasonically welding a conductor wire to an electrical terminal, comprising the steps of:
providing one or more conductor wires;
providing said electrical terminal with a U-shaped channel portion having a relatively unbroken internal surface for receiving said one or more conductor wires and upstanding tabs forming part of said channel portion;
providing an ultrasonic horn having a welding tip sized to enter said channel portion;
confining said electrical terminal adjacent said welding tip with a work support device;
moving said welding tip between said upstanding tabs into said U-shaped channel portion to directly contact the one or more conductor wires and press the conductor wires against the relatively unbroken surface of the electrical terminal whereby the upstanding tabs prevent any contact of said welding tip with the work support device; and
ultrasonically welding said one or more conductor wires to the relatively unbroken internal surface of said electrical terminal with said welding tip.

8. The method of claim 7 wherein the step of confining said electrical terminal includes providing a work support device having a U-shaped chamber for receiving said electrical terminal.

9. The method of claim 8 including the step of disposing said electrical, terminal into said U-shaped chamber whereby the upstanding tabs of said channel portion contact the walls of said U-shaped chamber so that the welding tip does not contact the walls of said chamber portion.

10. The method of claim 9 wherein the electrical terminal includes a base surface and wherein the upstanding tabs extend upward from the base surface beyond the walls of the U-shaped chamber.

11. Apparatus for ultrasonically welding a conductor wire to an electrical terminal with a U-shaped channel portion having a relatively unbroken internal surface for receiving one or more conductor wires, and upstanding tabs forming part of said channel portion, comprising:
an ultrasonic horn having a welding tip sized to enter said channel portion;
means for confining said electrical terminal and said one or more conductor wires within said U-shaped channel portion adjacent said welding tip, wherein said confining means comprises a work support device having a U-shaped chamber for receiving said electrical terminal, the upstanding tabs of said U-shaped channel portion being in contact with the walls of said U-shaped chamber to prevent contact of said welding tip with the walls of said chamber portion, and wherein the upstanding tabs extend upward from the base surface beyond the walls of the U-shaped chamber;
means for moving said welding tip between said upstanding tabs into said channel portion directly against the conductor wires whereby the upstanding tabs prevent contact of said welding tip with the confining means; and
means for ultrasonically welding said wires with said welding tip to the relatively unbroken surface of the electrical terminal.

12. The method of ultrasonically welding a conductor wire to an electric terminal, comprising the steps of:
providing one or more conductor wires;
providing said electrical terminal with a U-shaped channel portion having a relatively unbroken internal surface for receiving said one or more conductor wires and upstanding tabs forming part of said channel portion;
providing an ultrasonic horn having a welding tip sized to enter said channel portion;
confining said electrical terminal adjacent said welding tip with a work support device, wherein the step of confining said electrical terminal includes providing a work support device having a U-shaped chamber door receiving said electrical terminal;
disposing said electrical terminal into said U-shaped chamber whereby the taps of said channel portion contact the walls of said U-shaped chamber so that the welding tip does not contact the walls of said chamber portion, wherein the upstanding tabs extend upward from the base surface beyond the walls of the U-shaped chamber;
moving said welding tip between said upstanding tabs into said U-shaped channel portion to directly contact the one or more conductor wires and press the conductor wires against the relatively unbroken surface of the electrical terminal whereby the upstanding tabs prevent contact of said welding tip with the work support device; and
ultrasonically welding said one or more conductor wires to the relatively unbroken internal surface of said electrical terminal with said welding tip.

* * * * *

UNITED STATES PATENT AND TRADEMARK OFFICE
CERTIFICATE OF CORRECTION

PATENT NO. : 4,817,814
DATED : April 4, 1989
INVENTOR(S) : Guillermo Coto, Curtis L. Welter, Michael Patrikios It is certified that error appears in the above-identified patent and that said Letters Patent is hereby corrected as shown below:

In Column 5, line 45, delete "," before the word "terminal".

In Column 6, line 39, delete "door" and insert the word -- for -- in its place.

Signed and Sealed this

Twenty-ninth Day of August, 1989

Attest:

DONALD J. QUIGG

Attesting Officer

Commissioner of Patents and Trademarks